March 25, 1941.  K. H. HUBBARD ET AL  2,236,097

REGULATOR

Filed May 15, 1937  4 Sheets-Sheet 1

INVENTOR
KARL H. HUBBARD
WILLIAM J. BROWN
BY
D. Clyde Jones
ATTORNEY

March 25, 1941.　　K. H. HUBBARD ET AL　　2,236,097
REGULATOR
Filed May 15, 1937　　4 Sheets-Sheet 2
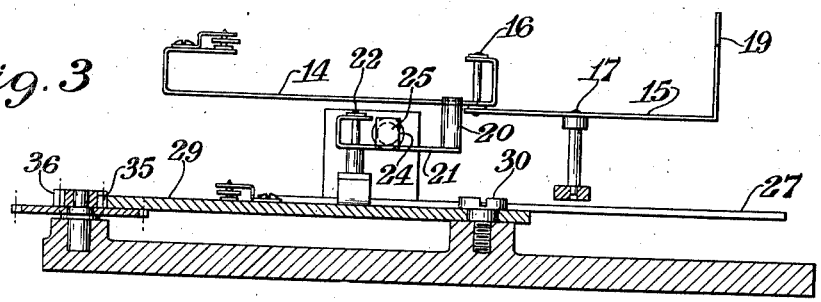
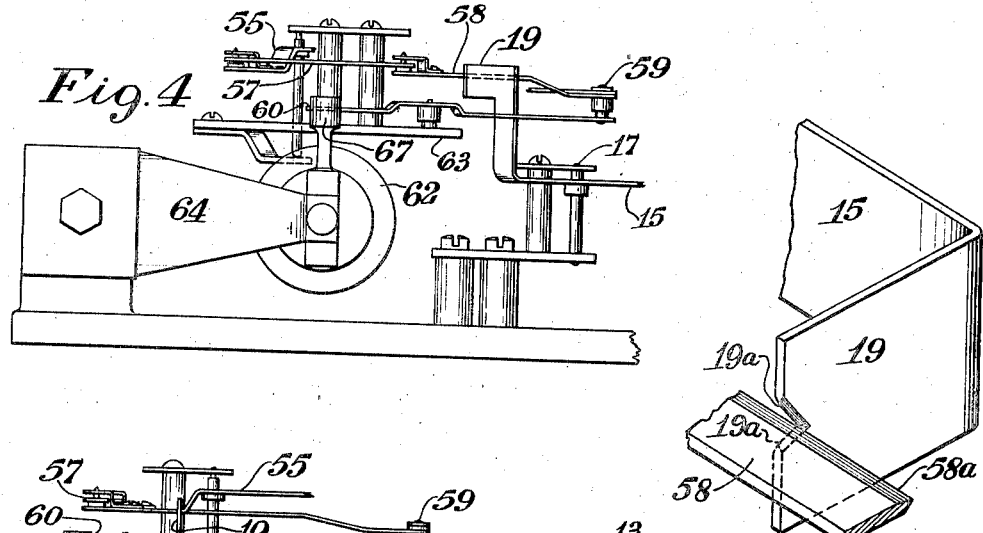
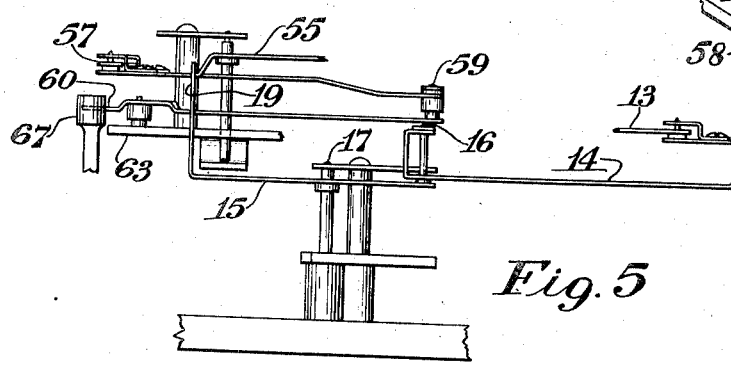
INVENTOR.
KARL H. HUBBARD
WILLIAM J. BROWN
BY
ATTORNEY.

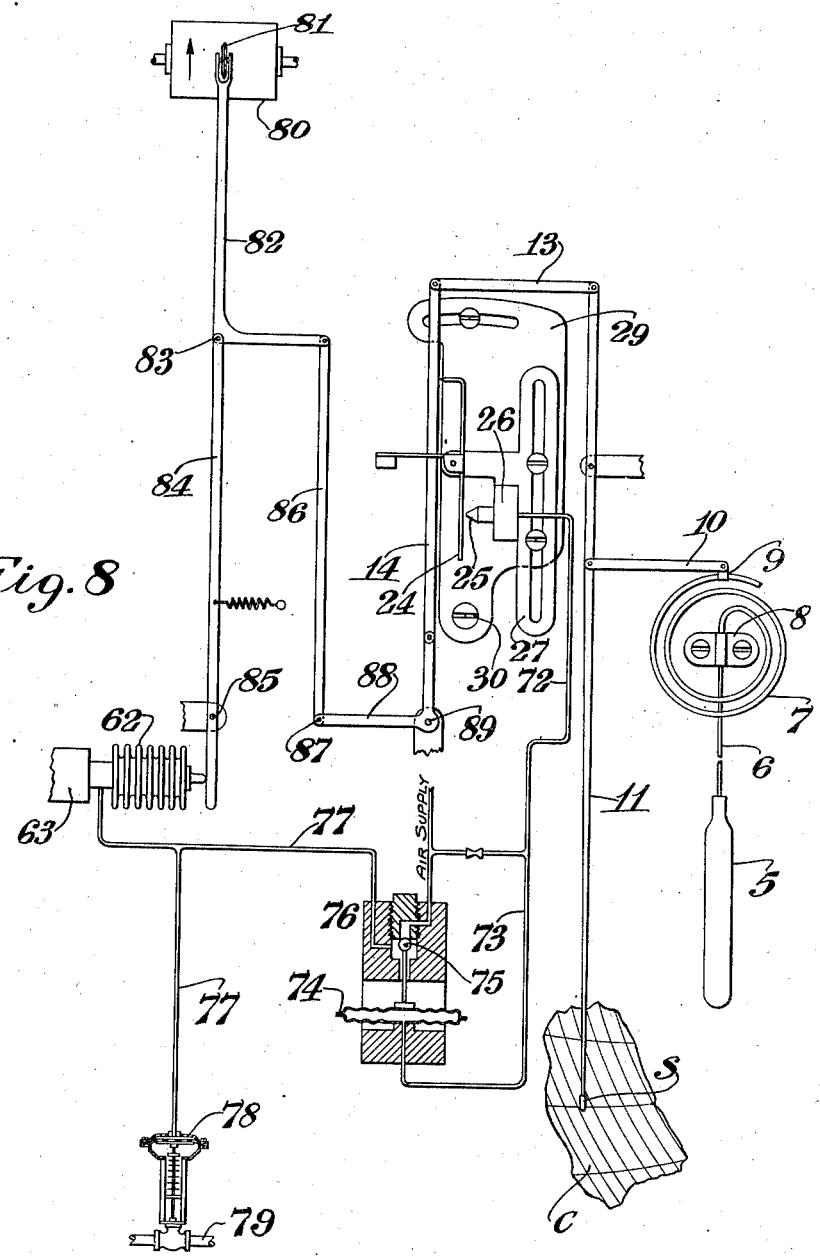

Patented Mar. 25, 1941

2,236,097

UNITED STATES PATENT OFFICE 2,236,097

REGULATOR

Karl H. Hubbard, Rochester, and William J. Brown, Spencerport, N. Y., assignors to Taylor Instrument Companies, Rochester, N. Y., a corporation of New York Application May 15, 1937, Serial No. 142,854

7 Claims. (Cl. 236—82)

This invention relates to regulators.

In the Hubbard et al. Patent No. 2,035,966 there is disclosed a regulator of the dual response or reset type which is designed to effect accurate regulation under extremely adverse conditions.

The present invention has for its purpose an improved regulator of the mentioned type in which the fluid damping system of the previous type is replaced by mechanical reset means, possessing a more flexible reset rate adjustment and obviating many of the disadvantages inherent in such a fluid system.

Figures 1, 2:
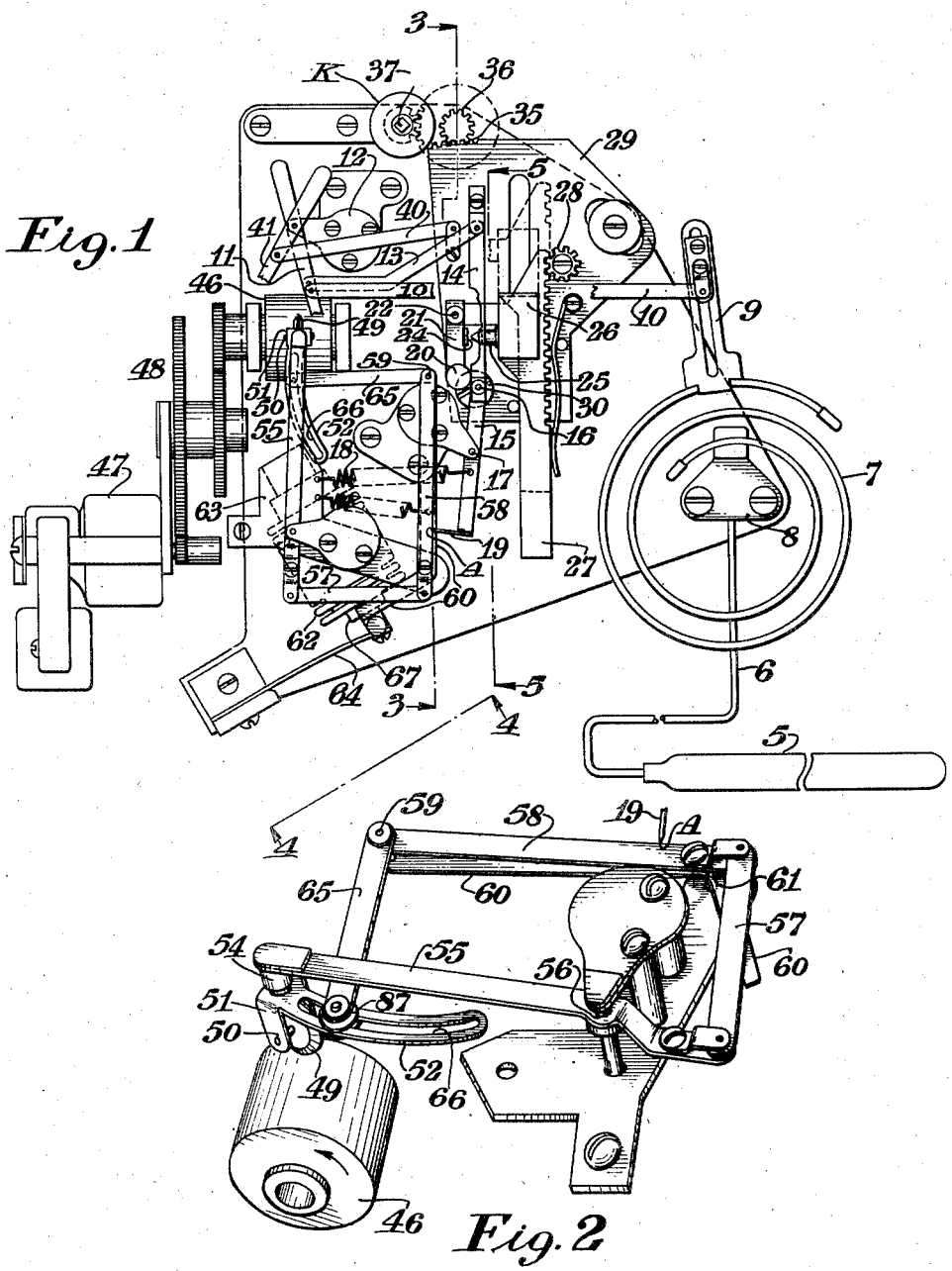
Figure 7:
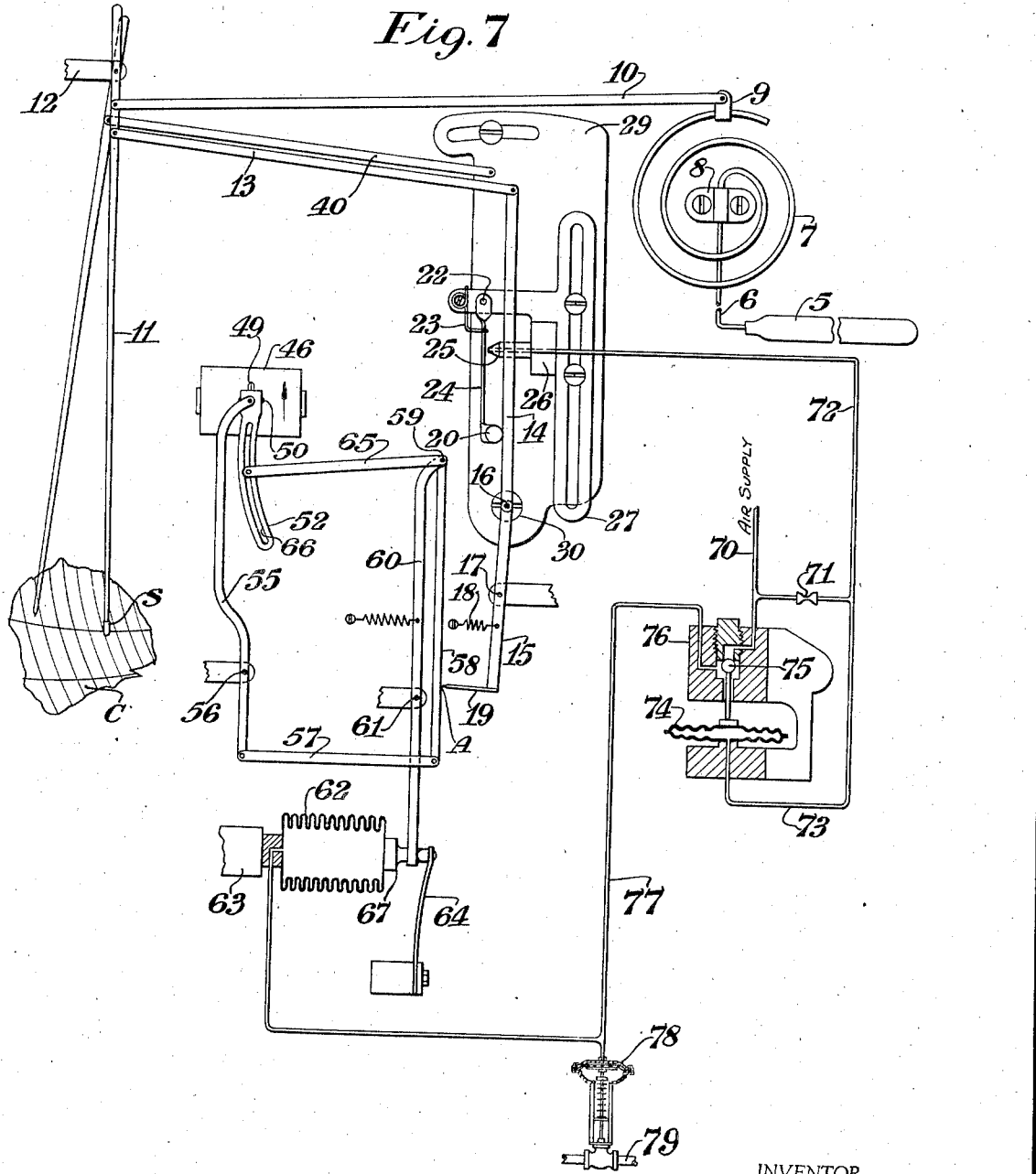

The various features and advantages of the invention will appear from the detailed description and claims when taken with the drawings in which Fig. 1 is a front elevation of the regulator of this invention; Fig. 2 is a perspective view of the resetting mechanism of the regulator; Fig. 3 is a section through the regulator taken substantially on the line 3—3 of Fig. 1, looking in the direction of the arrows; Fig. 4 is a fragmentary elevation of a portion of the regulator looking to the left of the line 4—4 in the direction of the arrows in Fig. 1; Fig. 5 is a fragmentary view of that portion of the regulator illustrated at the left of the line 5—5 of Fig. 1; and Fig. 6 is a greatly enlarged detail view illustrating the contact relation between two cooperating levers of the regulator; Fig. 7 is a diagrammatic showing of the regulator of Fig. 1 incorporated in a regulating system; and Fig. 8 is also a diagrammatic showing of a modified form of the invention.

Referring especially to Fig. 1, there is disclosed a tube system filled with a thermosensitive medium which system comprises a bulb 5 connected by a capillary tube 6 to a Bourdon spring 7. One end of the Bourdon spring is secured to the frame 8, while the free end thereof carries a suitable take-off arm 9 connected by a link 10 to a pen arm 11. The pen arm is mounted for rotation on the fixed pedestal 12 with its free end, carrying a stylus S in operative relation to a chart C (Fig. 7). The pen arm is connected by a link 13 to the upper end of a differential lever 14. This lever has its lower end pivotally connected at 16 to the upper end of a second lever 15 which is pivotally supported at 17 on a pedestal carried by the frame. The lower end of the lever 15, which is normally urged by the spring 18 in a clockwise direction, is provided with a bendable contact blade 19.

The differential lever 14 is normally engaged by an adjustable eccentric 20 carried at the free end of a baffle arm 21 which is suitably pivoted at 22 on an extension of the nozzle block plate 27. The nozzle block 26 is carried by the plate 27 which is adjustable vertically on the rotatably adjustable support 29 as will be set forth. The baffle arm 21 carries a baffle 24 adjacent the nozzle 25 which is mounted on the nozzle block 26. A spring 23 (Fig. 7) normally urges the baffle arm 21 and its baffle 24 toward the nozzle 25. The plate 27 for supporting the baffle arm and nozzle block has a rack formed on one edge thereof, the teeth of this rack being engaged by the rotatable gear 28 so that the nozzle and baffle carried by the plate 27 are adjustable in a vertical direction with respect to the support 29 whereby the sensitivity of the instrument can be readily changed. It will be understood that when the plate 27 is adjusted to a lower position on the support 29, a greater movement of the pen arm 11 is required to effect a given relative movement of the baffle with respect to the nozzle and the resultant given movement of the diaphragm valve, that is, the instrument has lower sensitivity. An upward adjustment of the plate 27 on the support 29 increases the sensitivity.

The support 29 is mounted to swing on the pivot 30 carried by the instrument frame. Its upper edge is provided with gear teeth 35 engaged by a pinion 36 which is included in a suitable gear train. When the staff 37 is rotated by means of hand knob K, the support 29 can be swung to adjust the control point of the instrument. The support 29 is connected by a link 40 to an indicating arm 41 which indicates, in connection with a chart shown in Fig. 7, the selected control point of the instrument.

The instrument also comprises a sensitivity reducing and reset mechanism which compensates for load changes and sudden temperature deviations. This reset mechanism includes a drum or cylinder 46 which is slowly and continuously rotated at approximately a uniform rate by the motor 47, through a train of speed-reducing gears generally designated 48. The drum is engaged by the edge of a disc 49 which has its axle 50 supported in a pair of rearwardly extending ears 51 formed on one end of the arcuate arm 52 so that the axle 50 is normally maintained parallel to the axis of the drum, as will be hereinafter set forth. The last-mentioned end of this arm is provided with a pivot projecting at right angles to the axle 50, which pivot is rotatably mounted in a hub 54 carried at the upper end of the lever 55. The lever 55 is pivotally supported on the frame at 56 and its lower end (Fig. 1) is connected by a link 57 to the lower end of a second differential lever 58 with which the blade 19 on lever 15 makes contact. In order to insure a definite position relation between the lever 58 and the lever 19, the contacting edge 58a of the lever 58 is reduced to a knife edge adjusted to engage a V-shaped notch defined by knife edges 19a in blade 19 (Fig. 6). The upper end of the lever 58 is pivotally connected at 59 to the upper end of the lever 60. The lever 60, in turn, is pivotally supported on the frame at 61 and has its lower end in engagement with an arm 67 carried in the movable end of a metal bellows 62 which has its fixed end secured to a support 63 carried by the frame of the instrument. A spring 64 normally engages the movable end of the bellows 62 to load it so that the effect of the hysteresis thereof is limited as much as possible.

It has been mentioned that the second differential lever 58 is connected by the pivot 59 to the upper end of the lever 60. A link 65 connected at one end to the pivot 59 has its other end frictionally connected by sliding button 87 (Fig. 2) in the slot 66 provided in the arcuate arm 52. This frictional connection permits adjustment of the left end of lever 65 to any point along the slot 66 so that the rate at which the resetting mechanism effects its operation for any given deviation, is controllable at will. It should be understood that the lever arrangement of the reset mechanism just described is preferably so designed and proportioned that a given point such as A on the differential lever 58, which is approximately at the point thereon where the contactor 19 engages this lever is substantially brought back to the original position when equilibrium has established and its axis is parallel with that of the drum irrespective of the amount of movement of the roller 49 across the drum.

In the operation of the instrument the drum 46 is constantly rotated while the edge of the disc 49 is in engagement therewith. Upon any change in temperature at the bulb 5, the Bourdon spring unwinds upon an increase in temperature and winds up upon a decrease in temperature. Let it be assumed that this temperature at the bulb 5 decreases so that the Bourdon spring 7 winds up. The movement of the free end of the spring is transmitted through the link 10 to the pen arm 11 causing this arm to move counterclockwise across the chart. This motion of the pen arm, in turn, is transmitted through the link 13 to the upper end of arm 14 thereby causing the upper end of this arm to rotate in a clockwise direction about its pivot 16 which is carried on the upper end of lever 15. This movement of the arm 14 permits the spring-urged baffle 24 to approach the nozzle 25. It should be appreciated that compressed air or a like fluid medium is continuously supplied through the common supply pipe 70 (Fig. 7), constriction 71, and branch conduit 72 to the orifice in the nozzle 25. Thus compressed air is continuously escaping through this orifice except as its escape is reduced when the baffle approaches the nozzle.

In response to the mentioned approach of baffle 24 to the nozzle, the pressure of air in the conduit 72 is immediately increased and this increase in pressure is transmitted through the branch conduit 73 to the metal bellows or capsular chamber 74. In response to this increase in pressure the capsular chamber or bellows 74 expands and the movable element 75 of the pilot relay valve 76 closes to reduce the flow of compressed air from the supply pipe 70 to the conduit 77. This conduit communicates with the bellows 62 and with the diaphragm top of the motor valve 78 which controls the flow of the temperature regulating medium through pipe 79. When the pressure in conduit 77 is reduced, it causes the bellows 62 to contract and permits the motor valve to move toward its opened position due to its spring. The lower end of the lever 60 which engages the movable end of the bellows 62 is thus permitted to rotate in a clockwise direction under the action of its biasing spring. The upper end of the lever 60 moves toward the right as illustrated in Figs. 1 and 7 to cause the lever 58 to rotate in a clockwise direction about its pivot 59. Lever 58 when thus moved forces the blade 19 on the lower end of lever 15 toward the right, thereby rotating the lever 15 in a counterclockwise direction around its pivot 17. As the lever 15 moves in this manner, its upper end moves the pivot 16 so that the lower end of the differential lever 14 is moved toward the left. Thus the lower end of the lever moves in a direction opposite to the direction in which its upper end was moved by the winding up of the Bourdon spring in response to the temperature decrease. Lever 14 forces the baffle 24 almost back to its original position thus reducing the effective motion of baffle 21 to a very small amount and thereby reducing the sensitivity of the instrument. The operations of the instrument just described are effected almost instantaneously so that this primary response just described may be considered as a prompt low sensitivity response.

A delayed second response of the instrument thereafter takes place, it being understood that the primary response merges into the second response or the second response is superimposed thereon. The second response starts as soon as the pivot 59 at the upper end of the lever 60 is moved toward the right by the mentioned contraction of bellows 62. This movement of the pivot 59 causes the link 65 to rotate the slotted arm 52. As this arm is thus rotated, the axle of the disc 49 is moved out of parallelism with the axis of the drum 46. It should be understood that the amount of angularity between the axle of the disc and the axis of the drum is a function of the original temperature deviation. Since the drum 46 is constantly rotated with the edge of the disc 49 in engagement therewith, the disc will travel along the drum until its axle is again parallel to the axis of the drum. The disc 49, as it moves along the drum due to the rotation of the drum, slowly swings the lever 55 in a clockwise direction. This motion of the lever 55 is communicated by the link 57 to the lower end of the differential lever 58 causing this lever to recede from the contact blade 19. This permits the lever 15 to swing, under the action of spring 18, in a clockwise direction whereby its upper end gradually moves the lower end of lever 14 so that the original spacing between the baffle 24 and the nozzle 25, due to the mentioned deviation, is approximately restored. It should be pointed out that when disc 49 has its axle moved out of parallelism with the axis of the drum, the rotation of the drum at first will cause this axle to swing rapidly toward parallelism with the axis of the drum and to swing gradually or more slowly as the restoration to the parallel relation is approached. In other words, it might be stated that the axle of the disc has an asymptotic approach toward the parallel relation with the axis of the drum, and the motion of the disc across the drum is a function of the original deviation.

These movements of the parts last mentioned cause the differential lever 15 to retrace in the opposite sense the movement which previously caused the reduction in sensitivity thereby effecting a final regulation of the controlled medium similar to that which would have been effected by a regulator of extremely high sensitivity. It will be understood that on an increase in temperature at the bulb 5, the instrument will operate in a similar manner but in the reverse sense, to effect regulation.

In Fig. 8 there is illustrated a diagrammatic showing of a slightly modified arrangement of the invention, which is also adapted to effect a prompt primary regulation followed by a delayed regulation in the same sense in response to any deviation in the condition to be controlled. In this arrangement the timing device differs from that previously described and includes a drum or other surface 80 which is continually rotated preferably at a slow uniform rate. This drum is engaged by a contactor 81, which may take the form of a disc rotatably mounted on the free end of an arm 82 in such a manner that the edge of the disc contacts the drum 80, the axis of the disc being generally parallel to the axis of the drum when the arm 82 is in its equilibrium condition. The arm 82 is pivoted at 83 on the lever 84 which is mounted at 85 to swing on a fixed support. The arm 82 is pivotally connected to the one end of a link 86, the other end of which is pivotally connected at 87 to a bell crank lever 88. The lever 88 is pivoted at 89 on a fixed support. The other arm of the bell crank lever has pivotally mounted thereon the free end of the differential lever 14, which is identical in function with the differential lever 14 of Fig. 7. A bellows 62, corresponding in function to the bellows 62 of Fig. 7 contacts an intermediate point on lever 84. The remaining portions of this instrument are identical with the corresponding parts of the instrument shown in Fig. 7 and are identified by like reference characters.

In the operation of this modified arrangement, when the temperature at the bulb 5 decreases, the Bourdon spring 7 tends to wind up and in so doing causes the pen arm 11 to move counterclockwise. This movement of the arm 11 is transmitted through the link 13 to the upper end of the differential lever 14, causing this lever to rotate in a counterclockwise direction. This movement of lever 14 permits the baffle 24 to approach the nozzle 25. As the baffle approaches the nozzle, the pressure in the conduit 72 which communicates with the nozzle 25, as well as in conduit 73, increases so that the capsular chamber 74 expands and moves the element 75 of the relay valve 76 so that it reduces the flow of compressed air through the conduit 77 to the bellows 62 and to the diaphragm motor top of the valve 78. This motor valve controls the flow of a temperature regulating medium through pipe 79 in the well-known manner. As soon as the bellows 62 contracts in response to the decrease in pressure, the lever 84 is moved clockwise so that the arm or contact support 82 is moved into an angular position with respect to line of motion of the drum 80. When the contact support 82 is thus moved, it actuates the link 86 and, in turn, the bell crank 88 to swing the lower end of the differential lever 14 in a counterclockwise direction. This causes the baffle 24 to recede from the nozzle 25 a distance almost equal to the amount of its approach toward the nozzle in response to the mentioned temperature deviation. This in effect reduces the sensitivity of the device.

As the drum rotates with the contact or disc 81 in contact therewith, the disc moves the support 82 gradually counterclockwise until the support is in parallel relation with its former position which it occupied at the time when the mentioned temperature deviation took place. During the time that the disc 81 is moving its support into this parallel relation, the link 86 gradually actuates the bell crank lever 88 and, in turn, the differential lever 14 in such a direction as to restore approximately the spacing between the baffle and the nozzle which resulted from the initial response to the temperature deviation.

It will be understood that as the differential lever 14 thus changes the spacing between the baffle and the nozzle, the air pressure in the conduits 72 and 73 changes accordingly to vary the opening through the relay valve 76. This relay valve, in turn, correspondingly changes the adjustment of the diaphragm motor valve 78.

An increase in temperature at the bulb 5 causes the device to operate in a similar manner, but in the reverse sense.

While the invention has been described for temperature regulation, it is also applicable for regulating various other conditions such as pressure, flow and liquid level.

We claim:

1. In a regulating device for maintaining a condition at a given value, means sensitive to and actuated by a variation in said condition, primary mechanism operable in an initial direction by said means, secondary mechanism including means responsive to the operation of the primary mechanism for originally operating said primary mechanism in the reverse direction, said secondary mechanism also including a rotatable drum, means for rotating said drum at a substantially uniform rate, a rotatable disc in engagement with said drum and having its axis of rotation normally parallel to the axis of rotation of said drum, means including said responsive means for angularly displacing the axis of said disc an amount which is a function of said initial operation of said primary mechanism, the rotation of said drum serving to move said disc and thereby restore the axis thereof to parallelism with the axis of said drum at a diminishing rate, means controlled by said disc for governing the operation of said secondary mechanism, and a member jointly controlled by said primary and said secondary mechanisms.

2. In a regulating device for maintaining a condition at a given value, means sensitive to and actuated by a variation in said condition, primary mechanism operable in an initial direction by said means, secondary mechanism including means responsive to the operation of the primary mechanism for originally operating said primary mechanism in the reverse direction, said secondary mechanism also including an element having a moving surface, means for moving said surface at a substantially uniform rate, a rotatable disc in engagement with said surface and having its axis of rotation normally perpendicular to the line of motion of said surface at its point of contact with the surface, means including said responsive means for angularly displacing the axis of said disc an amount which is a function of said initial operation of said primary mechanism, the motion of said surface serving to move said disc and thereby restore, at a diminishing rate, the axis thereof to perpendicularity with the line of motion of the surface at the point of contact, means controlled by said disc for governing the operation of said secondary mechanism, and a member jointly controlled by said primary and said secondary mechanisms.

3. In a regulating device for maintaining a condition at a given value, means sensitive to and actuated by a variation in said condition, primary mechanism operable in an initial direction by said means, secondary mechanism including means responsive to the operation of the primary mechanism for originally operating said primary mechanism in the reverse direction, said secondary mechanism also including an element having a moving surface, means for moving said surface at a substantially uniform rate, a movable support, a contactor carried thereby in engagement with said surface, means including said responsive means for angularly displacing the support for said contactor with respect to the line of motion of said surface, an amount which is a function of said initial operation of said primary mechanism, the motion of said surface in cooperating with said contactor serving to move said support at a diminishing rate into parallelism with its equilibrium position, means controlled by said support for governing the operation of said secondary mechanism, and a member jointly controlled by said primary and said secondary mechanisms.

4. In a regulating device, control mechanism to be operated, a source of pressure fluid, means including a conduit for supplying fluid from said source to operate said mechanism, a valve comprising a nozzle communicating with said conduit and a baffle cooperating with said nozzle to control the escape of pressure fluid therethrough, a lever having one end movable in response to a deviation from a predetermined condition for establishing a corresponding initial space relation between said nozzle and said baffle, means responsive to the variation in the pressure of the fluid in said nozzle, due to the changed space relation between said baffle and said nozzle for moving said lever to effect a reduction in the amount of said initial space relation between said baffle and said nozzle whereby the sensitivity of the device is reduced, and means including a damping device effective according to an asymptotic function for moving said lever in a direction to approximately restore said initial space relation, said damping device including a continually rotating cylinder and a pivoted lever frictionally engaging said cylinder and cooperating with said first lever.

5. In a regulating device, control mechanism to be operated, a source of pressure fluid, means including a conduit for supplying fluid from said source to operate said mechanism, a valve comprising a nozzle communicating with said conduit, and a baffle cooperating with said nozzle to control the escape of pressure fluid therethrough, means responsive to a deviation from a predetermined condition for establishing a corresponding initial space relation between said baffle and said nozzle, a lever actuated in response to a variation in the pressure of the fluid in said nozzle for reducing the amount of said initial space relation between the baffle and nozzle proportionately to said deviation, and means including said lever for approximately restoring said initial space relation between said baffle and nozzle, said means including a constantly rotating drum and a rotatable disc having its edge in engagement with said drum whereby the axis of said disc is normally in parallel relation with that of said drum, means including said lever for displacing the axis of said disc with respect to the axis of said drum, and means actuated by said disc in the course of restoring its axis into parallelism with the axis of said drum for restoring said lever to approximately its original position.

6. In a regulating device, control mechanism to be operated, a source of pressure fluid, means including a conduit for supplying fluid from said source to operate said mechanism, a valve comprising a nozzle communicating with said conduit and a baffle cooperating with said nozzle to control the escape of pressure fluid therethrough, a link having one end movable in response to a deviation from a predetermined condition for establishing a corresponding initial space relation between said nozzle and said baffle, a lever pivotally supported at an intermediate point thereof and having pivoted at one end thereof the other end of said link, means responsive to the variation in the pressure of the fluid in said nozzle due to the changed space relation between said baffle and said nozzle, for moving the free end of said lever and, in turn, said link to effect a reduction in the amount of the established space relation between said baffle and said nozzle whereby the sensitivity of the device is reduced, and means including time delay mechanism effective to move said lever and, in turn, said primary link in a direction to approximately restore said initial space relation, said time delay mechanism including a continually rotating cyclinder and a pivoted lever frictionally engaging said cylinder and cooperating with said first lever.

7. In a regulating device, control mechanism to be operated, a source of pressure fluid, means including a conduit for supplying fluid from said source to operate said mechanism, a valve comprising a nozzle communicating with said conduit and a baffle cooperating with said nozzle to control the escape of pressure fluid therethrough, a primary differential lever having one end movable in response to a deviation from a predetermined condition for establishing a corresponding initial space relation between said nozzle and said baffle, a first lever pivotally supported at an intermediate point thereof and having pivoted at one end thereof the other end of said primary differential lever, a continuously rotating drum, a rotatable disc with its edge contacting said drum, an arm on which said disc is rotatably mounted, a second lever pivoted at an intermediate point thereof and having said arm pivotally mounted at the first end thereof, a third lever pivoted at an intermediate point thereof, a secondary differential lever having one end pivotally mounted adjacent one end of said third lever, said secondary differential lever contacting the free end portion of said first lever, means responsive to the variation of the pressure fluid in said nozzle due to the changed space relation between said baffle and said nozzle for operating said third lever and said second differential lever in a direction to move the contacting end of said first lever and, in turn, said primary differential lever to effect a reduction in the amount of the established space relation between said baffle and said nozzle whereby the sensitivity of the device is reduced, a first link connecting the other end of said second differential lever to the second end of said second lever, a second link connecting the first-mentioned end of said second differential lever to any one of various points along said arm whereby the movement of said second differential lever moves the axis of said disc out of parallelism with the axis of said drum an adjustable amount, said drum and disc cooperating through said second lever and said first link to move said second differential lever to a position in which said first lever and said first differential lever approximately restore the initial space relation between said baffle and said nozzle.

KARL H. HUBBARD.
WILLIAM J. BROWN.